United States Patent Office 3,222,180
Patented Dec. 7, 1965

3,222,180
WHISKEY STABILIZATION
Richard R. Sucietto, Cincinnati, Ohio, assignor to National Distillers and Chemical Corporation, New York, N.Y., a corporation of Virginia
No Drawing. Filed May 2, 1962, Ser. No. 191,720
9 Claims. (Cl. 99—48)

The present invention relates to a novel method of stabilizing distilled alcoholic liquors. More particularly, this invention pertains to a method of clarifying whiskeys and other distilled alcoholic liquors which have been aged in wooden containers or barrels.

Distillers have always had trouble with whiskeys becoming hazy, a condition which comes about during storage or shipping and which is aggravated by low temperatures, i.e., about 41° F. or below. Although the exact nature of these haze-producing constituents is not known, it is believed that they are, to a large extent, fatty materials. These fatty materials, which are considered to come from the grain, carry through into the high wines and end up in the whiskey barrel. Other haze-producing materials are believed to be certain extracts derived from the wooden container or barrel during the aging process. To combat this clouding of their whiskeys, distillers have had to resort to treating the whiskey with carbon or to chilling the whiskey to obtain the adsorption of floc precipitation of haze-producing constituents and other undesirable substances. The carbon treatment has proven to be somewhat unreliable, whereas chilling is somewhat time consuming and involves a large capital investment.

A reliable as well as a simple, fast, and inexpensive means of stabilizing liquors, such as bourbon or rye whiskeys, in order to retain their clear appearances has now been found. More specifically, it has been discovered that an aged alcoholic liquor may be clarified by treating it with a mixture of activated carbon and polyvinylpyrrolidone.

In accordance with the present invention, the aged alcoholic liquor to be stabilized is treated with an activated carbon and polyvinylpyrrolidone. In a preferred embodiment of this invention, the activated carbons which are employed as adsorbents are the gas adsorbent type; these carbons may, however, be admixed with an activated carbon of the decolorizing type. A proper combination of properties is required in an adsorbent for the most effective results, and it is seldom possible to predict the behavior of an activated carbon when applied to a new process or a new product. Two carbons having equal adsorptive powers for one substance may act quite differently for other substances, which makes it difficult to establish a relationship between the chemical structure and adsorbability of a particular activated carbon. The activated carbons used in the practice of the present invention must be carefully selected in order that the color, flavor, and congeners not be removed from the whiskey being stabilized. The term "gas adsorbent" indicates an activated carbon which is granular, mechanically strong, and relatively dense with very fine pore structure; while "decolorizing" indicates an activated carbon which is soft, finely pulverized, and highly porous. Examples of gas-adsorbing activated carbons are those commercially available as Columbia PW and Pittsburgh B. These are finely divided carbons of which approximately 90 to 100 percent pass the 100-mesh sieve. Examples of decolorizing activated carbons are Nuchars, Norits and Darcos. These are also finely divided carbons of which approximately 90 to 100 percent pass the 100-mesh sieve.

It has now been found, that although a whiskey may be clarified to some degree by the use of activated carbon alone, outstanding results are achieved when a mixture of activated carbons and polyvinylpyrrolidone are used. These agents may be added to the whiskey in any order or may be admixed prior to addition to the whiskey.

The amount of polyvinylpyrrolidone employed may vary over a wide range depending on the requirements of the particular whiskey being treated. In the tests described below the amount of polyvinylpyrrolidone is equivalent to at least 2 pounds per 1000 wine gallons of whiskey, and preferably between about 3 pounds and 8 pounds per 1000 wine gallons of the whiskey. In accordance with one feature of this invention, it has been found that a highly cross-linked polyvinylpyrrolidone in either solid, powdered form or in aqueous dispersion form is particularly effective. A cross-linked polyvinylpyrrolidone is currently sold under the designation of AT–496. The amount of activated carbon employed is equivalent to at least 0.5 pound per 1000 wine gallons of the whiskey, and preferably between about 1 and 2.5 pounds per 1000 wine gallons of the whiskey. Obviously the amounts of activated carbon and polyvinylpyrrolidone employed can be adjusted to give the desired stability to the particular whiskey feed. Moreover, whiskeys from different distillations and different mash bills will obviously require adjustment in the level of treatment.

The treatment time is not critical. It may vary from a period of about 15 to 90 minutes, and preferably from 30 to 60 minutes. The carbon and polyvinylpyrrolidone are separated from the system by filtering under pressure, and any known means may be employed for this separation. Conventional filter aids may be employed in effecting the foregoing separation.

The advantages achieved by using both activated carbon and polyvinylpyrrolidone for treating whiskey may be illustrated in the following tests, which are primarily set forth for purposes of illustration and not of limitation.

Samples of an 87° proof bourbon whiskey (200 ml.) were treated at room temperature (approx. 75° F.) as follows:

*Sample 1.*—Millipore filtered (negative control sample). A Millipore filter is a type of filter for the removal of microscopic and submicroscopic particles from liquids or gases. The filter is a cellulose ester membrane obtainable with controlled pore-size ranges from 10 millimicrons to 5 microns, providing absolute retention of all particles larger than the designated pore size.

*Sample 2.*—Stirred for 30 minutes with 0.0524 gram (2.12 pounds per 1000 wine gallons) of gas adsorbent activated carbon (Columbia PW carbon) and filtered.

*Sample 3.*—Stirred for 30 minutes with 0.0524 gram (2.12 pounds per 1000 wine gallons) of a mixture containing 2 parts by weight gas adsorbent activated carbon (Columbia PW carbon) and 1 part by weight of decolorizing activated carbon (Nuchar C–190N) and filtered.

*Sample 4.*—Stirred for 30 minutes with 0.0960 gram (4 pounds per 1000 wine gallons) of polyvinylpyrrolidone (AT–496) and filtered.

*Sample 5.*—Stirred for 30 minutes with 0.0960 gram (4 pounds per 1000 wine gallons) of polyvinylpyrrolidone (AT–496) and 0.0524 gram (2.12 pounds per 1000 wine gallons) of gas adsorbent activated carbon (Columbia PW) and filtered to remove the insoluble polyvinylpyrrolidone and activated carbon.

*Sample 6.*—Stirred for 30 minutes with 0.0960 gram (4 pounds per 1000 wine gallons) of polyvinylpyrrolidone (AT–496) and 0.524 gram (2.12 pounds per 1000 wine gallons) of a mixture containing 2 parts by weight gas adsorbent activated carbon (Columbia PW) and 1 part by weight of decolorizing activated carbon (Nuchar C–190N) and filtered.

*Sample 7.*—Refrigerated at 15° F. for 20 hours and filtered (positive control sample).

After filtration all samples were cooled to 20° F. and held for 4 hours. Turbidity of the whiskey samples was then measured by means of a Coleman Nephelometer. The samples were then stored at 41° F. for five months, after which they were examined visually. The results are listed in the following table:

| Sample No. | Treatment | Turbidity in Nephelos Units | Visual appearance after 5 months at 41° F. |
|---|---|---|---|
| 1 | Millipore filtered | Too high to measure. | Heavy flocculation. |
| 2 | Columbia PW carbon | 16 | Clear. |
| 3 | 2 parts Columbia PW carbon. 1 part Nuchar C-190N carbon. | 12 | Do. |
| 4 | Polyvinylpyrrolidone | 77 | Flocculated. |
| 5 | Polyvinylpyrrolidone Columbia PW carbon. | 8.0 | Clear. |
| 6 | Polyvinylpyrrolidone 2 parts Columbia PW carbon. 1 part Nuchar C-190N carbon. | 7.5 | Do. |
| 7 | Refrigerated and filtered | 10 | Do. |

The above data shows that a treatment with polyvinylpyrrolidone and activated carbon will yield a whiskey which is superior in clarity to treatment with activated carbon or with polyvinylpyrrolidone alone.

Above are disclosed but a limited number of embodiments of the process of the invention herein presented. It is obvious that a number of variations may be employed without departing from the scope of the invention herein disclosed, and it will be understood, therefore, that the foregoing specific embodiments are only illustrative of the inventive method.

What is claimed is:

1. A method of treating aged distilled alcoholic liquor which comprises contacting said liquor with activated carbon, in an amount which is at least about 0.5 pound per 1000 wine gallons, and cross-linked polyvinylpyrrolidone, in an amount which is at least about 2 pounds per 1000 wine gallons, for at least about 15 minutes to reduce the haze-producing constituents below contaminating levels, and separating the thus treated alcoholic liquor from said carbon and said polyvinylpyrrolidone.

2. The method of claim 1 wherein the activated carbon is a gas adsorbent activated carbon.

3. The method of claim 1 wherein the activated carbon is a mixture of a gas adsorbent activated carbon and a decolorizing activated carbon.

4. The method of stabilizing aged whiskey which comprises contacting aged whiskey with an amount of activated carbon which is at least about 0.5 pound per 1000 wine gallons, and an amount of cross-linked polyvinylpyrrolidone which is equivalent to at least about 2 pounds per 1000 wine gallons for at least about 15 minutes, and then separating said treated whiskey from said carbon and polyvinylpyrrolidone.

5. The method of claim 4 wherein the activated carbon is a mixture of gas adsorbent activated carbon and decolorizing activated carbon.

6. The method of claim 4 wherein the activated carbon is a gas adsorbent activated carbon.

7. The method of claim 4 wherein the amount of activated carbon is within the range of about 1 to 2.5 pounds per 1000 wine gallons of the whiskey.

8. The method of claim 4 wherein the amount of polyvinylpyrrolidone is within the range of about 3 to 8 pounds per 1000 wine gallons of the whiskey.

9. The method of claim 4 wherein said aged whiskey is contacted with the activated carbon and polyvinylpyrrolidone for a period of about 15 to 90 minutes.

References Cited by the Examiner

UNITED STATES PATENTS

| | | | |
|---|---|---|---|
| 2,367,557 | 1/1945 | Atwood | 99—48 |
| 2,688,550 | 9/1954 | McFarlane | 99—28 |
| 2,860,987 | 11/1958 | Werner | 99—48 |
| 2,863,773 | 12/1958 | Dalmau | 99—48 |
| 2,873,192 | 2/1959 | Walles et al. | 99—28 |
| 3,046,138 | 7/1962 | Eck et al. | 99—48 |

OTHER REFERENCES

Polyvinylpyrrolidone, publ. by Antara Chemicals, August 1957, New York, pp. 38–39 relied on.

Vinyl Resins, pp. 264–266, 1958.

A. LOUIS MONACELL, *Primary Examiner.*

ABRAHAM WINKELSTEIN, *Examiner.*